(12) United States Patent
Ogi et al.

(10) Patent No.: US 10,088,742 B2
(45) Date of Patent: Oct. 2, 2018

(54) LASER PROJECTION DISPLAY SYSTEM CONFIGURED TO EXECUTE SCANNING WITH LASER LIGHT IN ACCORDANCE WITH IMAGE SIGNALS

(71) Applicant: Hitachi-LG Data Storage, Inc., Tokyo (JP)

(72) Inventors: Yuya Ogi, Tokyo (JP); Tomoki Kobori, Tokyo (JP); Yoshiho Seo, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 15/646,350

(22) Filed: Jul. 11, 2017

(65) Prior Publication Data

US 2018/0020198 A1 Jan. 18, 2018

(30) Foreign Application Priority Data

Jul. 13, 2016 (JP) .................................. 2016-138131

(51) Int. Cl.
| | |
|---|---|
| G03B 21/20 | (2006.01) |
| H04N 9/31 | (2006.01) |
| G02B 26/10 | (2006.01) |
| G09G 3/02 | (2006.01) |
| G03B 21/28 | (2006.01) |

(52) U.S. Cl.
CPC ....... *G03B 21/2066* (2013.01); *G02B 26/101* (2013.01); *G03B 21/28* (2013.01); *G09G 3/025* (2013.01); *H04N 9/312* (2013.01); *H04N 9/3105* (2013.01); *H04N 9/3111* (2013.01); *H04N 9/3135* (2013.01); *H04N 9/3161* (2013.01); *H04N 9/3164* (2013.01)

(58) Field of Classification Search
CPC .. G02B 26/101; H04N 9/3135; H04N 9/3105; H04N 9/3111; H04N 9/312; H04N 9/3161; H04N 9/3164; G09G 3/025; G03B 21/2066; G03B 21/28
See application file for complete search history.

(56) References Cited

U.S. PATENT DOCUMENTS

| | | | |
|---|---|---|---|
| 2006/0255243 A1 | 11/2006 | Kobayashi et al. | |
| 2015/0022568 A1* | 1/2015 | Ishii | G03B 21/2013 345/697 |

FOREIGN PATENT DOCUMENTS

JP        2006-317681 A     11/2006

* cited by examiner

*Primary Examiner* — Sultan Chowdhury
*Assistant Examiner* — Magda Cruz
(74) *Attorney, Agent, or Firm* — Mattingly & Malur, PC

(57) ABSTRACT

A laser projection display system that executes, by swinging a scan mirror, scanning with laser light of multiple colors in accordance with image signals, thereby displaying an image in accordance with the image signals, includes: a timing adjustment unit that divides temporally a display period during which the image signals are displayed and a light emission period for intensity detection to detect the intensity of the laser light; a laser light source that generates the laser light of the multiple colors; a laser light source driving unit that drives the laser light source in synchronization with a signal from the timing adjustment unit; and a scan mirror driving unit including: a first scanning means that executes scanning in a first direction in response to synchronization signals according to the image signals, with laser light generated by the laser light source through the scan mirror.

14 Claims, 9 Drawing Sheets

PRIOR ART

LASER PROJECTION DISPLAY SYSTEM CONFIGURED TO EXECUTE SCANNING WITH LASER LIGHT IN ACCORDANCE WITH IMAGE SIGNALS

CLAIM OF PRIORITY

This application claims the priority based on the Japanese Patent Application No. 2016-138131 filed on Jul. 13, 2016. The entire contents of which are incorporated herein by reference for all purpose.

BACKGROUND

Technical Field

The present invention relates to a laser projection display system that displays an image by scanning with light emitted from a semiconductor laser or the like through a two-dimensional scan mirror.

Related Art

In recent years, laser projection display systems that use two-dimensional scan mirrors such as MEMS (Micro Electro Mechanical Systems) mirrors and semiconductor laser light sources have been becoming popular. In that regard, techniques have been proposed where in order to stabilize the brightness (luminance) of videos displayed, laser light intensity is monitored with the use of light emissions for intensity detection to detect the laser light intensity, and the driving current is controlled such that the output of the intensity is constant.

For example, JP 2006-317681 A discloses, in the abstract thereof, "the achievement of an image display system that can display color images with favorable image quality on a predetermined surface" as an objective, and as a solving means therefor, "an image display system including: multiple light source means that emit light fluxes in wavelength bands different from each other, subjected to optical modulation on the basis of image information; a light combination means that combines the light fluxes from the multiple light source means, into one light flux; a scanning means that forms the image information on a surface scanned by scanning with the light flux from the light combination means; and a control means that controls the scanning means and the multiple light source means in synchronization, and including: a light flux dividing means for dividing the light flux into multiple fluxes in any optical path on the light incidence side of the scanning means; a light receiving means in one of the light fluxes divided by the light flux dividing means; and an adjustment means that adjusts the amount of light emitted by one or more light source means from the multiple light source means, on the basis of the amount of light received by the light receiving means".

According to JP 2006-317681 A, as shown in FIG. 9, light emissions for intensity detection are executed during a non-image display period other than a period during which an image 91 is displayed on a screen 90, thereby making adjustments to laser light intensity. In FIG. 9, a solid line 92 represents a scanning line for scanning a region where images are displayed, and a dashed line 93 represents a scanning line for scanning a non-image display region. For some of the scanning line for scanning the non-image display region, semiconductor lasers emit red, green, and blue light (respectively denoted by reference numerals 94, 95, and 96), thereby making adjustments to the laser light intensity. It is to be noted that a solid line 97 represents a flyback of the scanning line. As just described, according to the technique disclosed in JP 2006-317681 A, light emissions for intensity detection are executed in the non-image display region, thereby making adjustments to the laser light intensity. However, the display image 91 is close in location to the light emissions 94 to 96 for intensity detection, and there is thus a need to incorporate a shielding object with a high degree of precision, in order to keep the light emissions for intensity detection from being projected in the screen 90. To this end, there is a need for a new member that requires precise incorporation, which causes an increase in cost. JP 2006-317681 A fails to consider any method for keeping the display image 91 mentioned above away from the light emissions 94 to 96 for intensity detection in terms of positional relationship. In addition, while it is also possible to keep the display image away from the locations of the light emissions for intensity detection by increasing the scanning angle and thus increasing the number of scanning lines for scanning the non-image display region, there is the problem of decreasing the luminance of the display screen, because of the decreased proportion of apart for image display in one frame of image.

SUMMARY

The present invention has been achieved in view of the problem mentioned above, and an object of the invention is to a laser projection display device which easily achieves a blocked light emission for intensity detection with a light blocking object, with a display image kept away from the location of the light emission for intensity detection, without decreasing the brightness of the display image.

The object mentioned above can be achieved, for example, by the invention as recited in the claims. To give a more specific example, a laser projection display system according to the present invention includes: a laser light source that generates laser light of multiple colors; a scanning unit that projects an image by scanning with laser light generated by the laser light source in accordance with synchronization signals for image signals; a timing adjustment unit that divides temporally a display period during which the image signals are displayed and a light emission period for intensity detection to detect the intensity of the laser light; a laser light source driving unit that drives the laser light source in synchronization with a signal from the timing adjustment unit; and a scan mirror driving unit including: a first scanning means that executes scanning in a first direction in response to synchronization signals according to the image signals, with laser light generated by the laser light source through the scan mirror; and a second scanning means that executes scanning in a second direction substantially perpendicular to the first direction at a lower speed than the first scanning means. The scan mirror driving unit increases the angular range of a deflection angle in scanning by the first scanning means during the light emission period for intensity detection, more than the angular range of a deflection angle during the display period.

According to the present invention, a laser projection display system can be provided which can easily achieve a blocked light emission for intensity detection with a light blocking object, with a display image kept away from the location of the light emission for intensity detection, without decreasing the brightness of the display image.

DETAILED DESCRIPTION

Embodiments of the present invention will be described in detail below with the use of the drawings. The following description is intended to describe an embodiment of the present invention, but not intended to limit the scope of the present invention. Therefore, one skilled in the art can adopt embodiments with each element or all elements thereof replaced with equivalents to the elements, and the scope of the present invention also encompasses therein these embodiments. It is to be noted that laser projection display systems in Examples will be described by providing an example of using a MEMS scan mirror as a scan mirror and a MEMS driver as a scan mirror driving unit.

Example 1

Figure 1:
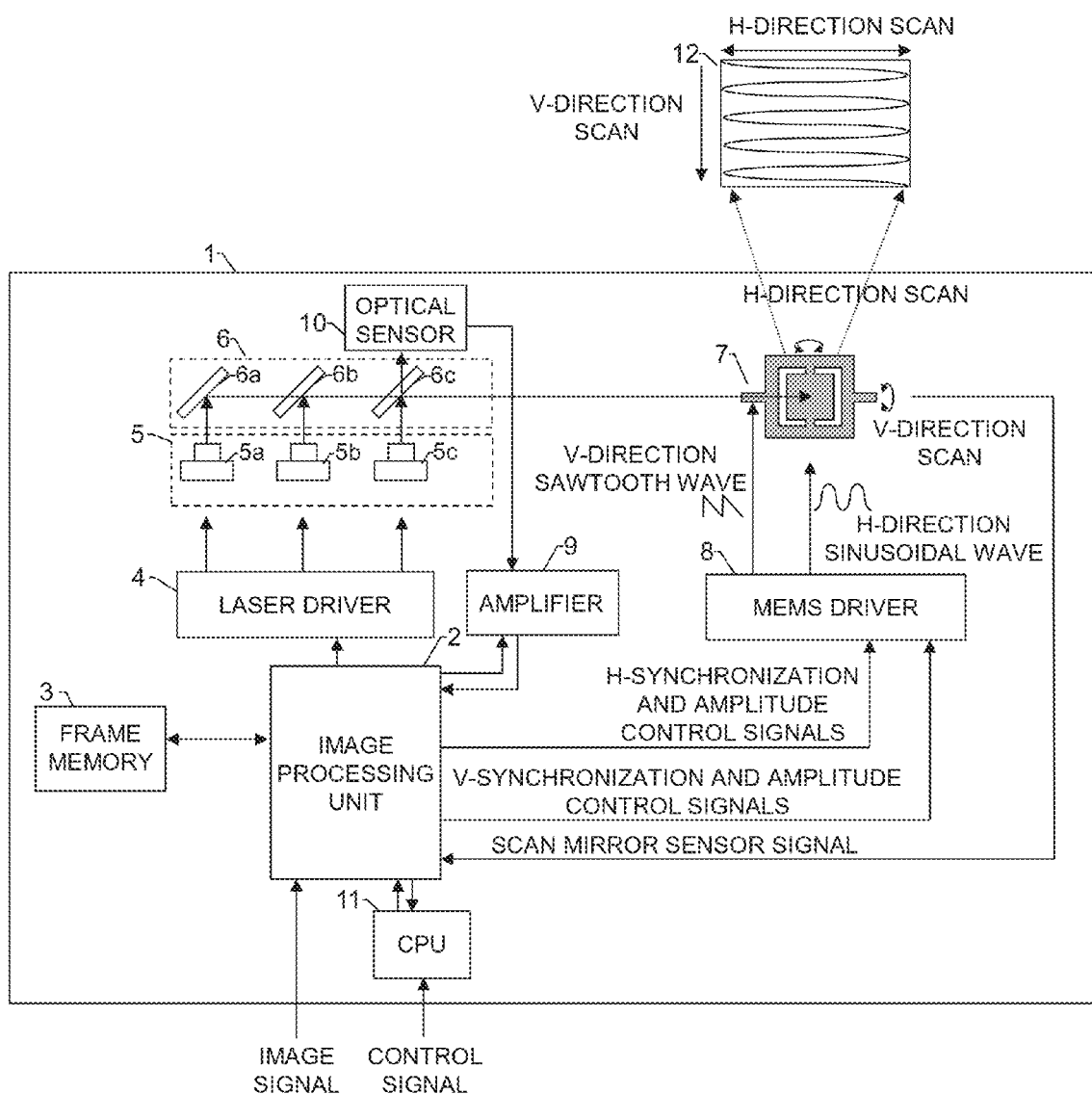
FIG. 1 is a block diagram illustrating the general configuration of a laser projection display system.

FIG. 1 is a block diagram illustrating the general configuration of a laser projection display system according to Example 1. The laser projection display system 1 has an image processing unit 2, a frame memory 3, a laser driver (laser light source driving unit) 4, a laser light source 5, a reflective mirror 6, a MEMS scan mirror 7, a MEMS driver 8, an amplifier 9, an optical sensor 10, and a CPU (Central Processing Unit) 11, and displays a display image 12 on a projection surface. The configurations and operations of the respective units will be described.

The image processing unit 2 generates image signals by making various types of corrections to externally input image signals, and generates horizontal synchronization signals (H synchronization signals) and vertical synchronization signals (V synchronization signals) in synchronization with the image signals generated, and supplies the signals to the MEMS driver 8. Additionally, the image processing unit 2 supplies, to the MEMS driver 8, amplitude control signals that control the deflection angle of the scan mirror 7. In addition, the image processing unit 2 receives scan mirror sensor signals that represent the drive status of the scan mirror 7, for example, the deflection angle information of the scan mirror. In this regard, the horizontal synchronization signal and the vertical synchronization signal, each composed of a display period during which image signals are projected and a flyback period during which image signals are not projected, respectively have a horizontal display period and a horizontal flyback period, and a vertical display period and a vertical flyback period. Hereinafter, the horizontal display period and the vertical display period will be referred to collectively as a display period, whereas the horizontal flyback period and the vertical flyback period will be referred to collectively as a flyback period. In this regard, the period corresponding to an image, composed of the vertical display period and the vertical flyback period, is referred to as one frame. In addition, the image processing unit 2 delivers, to the laser driver 4, current setting signals in response to information acquired from the CPU 11 or the output of the optical sensor 10, amplified by the amplifier 9, and delivers, to the laser driver 4, image signals that have various types of correction made thereto. In this regard, the current setting signal refers to a conversion factor that is used by the laser driver 4 for converting image signals to current values that are supplied to the semiconductor laser 5.

In addition, the image processing unit 2 executes light emission processing for intensity detection, for detecting the light intensity of the laser light source, with the flyback period partially used as a light emission period for intensity detection. This light emission processing for intensity detection will be described later.

In this regard, the various types of corrections made in the image processing unit 2 include corrections of image distortions caused by scanning through the MEMS scan mirror 7, and changes to image brightness and gradation adjustments in accordance with LOOK UP TABLE (hereinafter, referred to as LUT). It is to be noted that the image distortions are caused because of the difference in relative angle between the laser projection display system 1 and the projection surface, optical axis deviations between the laser light source 5 and the MEMS scan mirror 7, and the like.

The laser driver 4 receives the image signals with the various types of corrections made thereto and the current setting signals, which are output from the image processing unit 2, and in response to the signals, modulates the driving current for the laser light source 5. The laser light source 5 has, for example, three semiconductor lasers (5a, 5b, 5c) for RGB, and emits laser light of RGB corresponding to the image signals for each of RGB of the image signals.

The three types of laser light of RGB are combined by the reflective mirror 6 including three mirrors, and the MEMS scan mirror 7 is irradiated with the combined light. The reflective mirror 6 is composed of special optical elements (dichroic mirrors) that reflects light of specific wavelengths and transmits light of the other wavelengths. Specifically, the reflective mirror 6 has: a dichroic mirror 6a that reflects laser light (for example, R light) emitted from the semiconductor laser 5a, and transmits laser light of the other colors; a dichroic mirror 6b that reflects laser light (for example, G light) emitted from the semiconductor laser 5b, and transmits laser light of the other colors; and a dichroic mirror 6c that reflects laser light (for example, B light) emitted from the semiconductor laser 5c, and transmits laser light of the other colors. Thus, the reflective mirror 6 combines the laser light of R light, G light, and B light into one type of light, and supplies the light to the MEMS scan mirror 7.

The MEMS scan mirror 7 is a scanning unit with a biaxial rotation mechanism, which can vibrate a central mirror unit in two directions of a first direction and a second direction substantially perpendicular to the first direction. The vibration of the MEMS scan mirror 7 is controlled by the MEMS driver 8. The MEMS driver 8 including: a first scanning means that executes scanning in the first direction; and a second scanning means that executes scanning in the second direction that is a direction substantially perpendicular to the first direction at a lower speed than the first scanning means, generates driving signals based on the horizontal and vertical synchronization signals and amplitude control signals delivered from the image processing unit 2, thereby driving the MEMS scan mirror 7.

In the example of FIG. 1, the first direction is regarded as the horizontal direction of the image, whereas the second direction is regarded as the vertical direction of the image, and the MEMS scan mirror 7 makes sinusoidal resonance motions in the horizontal direction in response to sinusoidal driving signals from the MEMS driver 8. At the same time, the mirror makes unidirectional uniform motions in the vertical direction in response to sawtooth wave driving signals from the MEMS driver 8. Thus, scanning with the laser light is carried out for such a trajectory as shown on the display image 12 in FIG. 1, and the scanning operation is synchronized with the operation of laser light modulation executed by the laser driver 4, thereby optically projecting the input image.

The optical sensor 10 measures the amount of laser light projected, and outputs the amount to the amplifier 9. The amplifier 9 amplifies the output from the optical sensor 10, in accordance with the amplification factor set by the image processing unit 2, and then outputs the amplified output to the image processing unit 2. In FIG. 1, the optical sensor 10 detects leaked light of the laser light of RGB combined by the reflective mirror 6. More specifically, the optical sensor 10 is disposed to be opposed to the semiconductor laser 5c with the dichroic mirror 6c interposed therebetween. While the dichroic mirror 6c has the property of transmitting the laser light from the semiconductor lasers 5a and 5b and reflecting the laser light from the semiconductor laser 5c, the transmission or reflectivity is not 100%, and the laser light from each semiconductor laser will be, by several percent, made incident to the optical sensor 10.

The CPU 11 has a role as a setting/inputting unit, for generally controlling the laser projection display system 1, and receiving external control signals, for example, the value of a deflection angle (hereinafter, referred to as a first deflection angle) of the scan mirror in scanning through the MEMS scan mirror by the desired first scanning means. The value of the desired first deflection angle of the MEMS scan mirror 7 is delivered via the CPU 11 to the image processing unit 2, and in the image processing unit 2, used for control of the MEMS scan mirror 7 in the light emission processing for intensity detection. The details will be described later.

Figure 2:
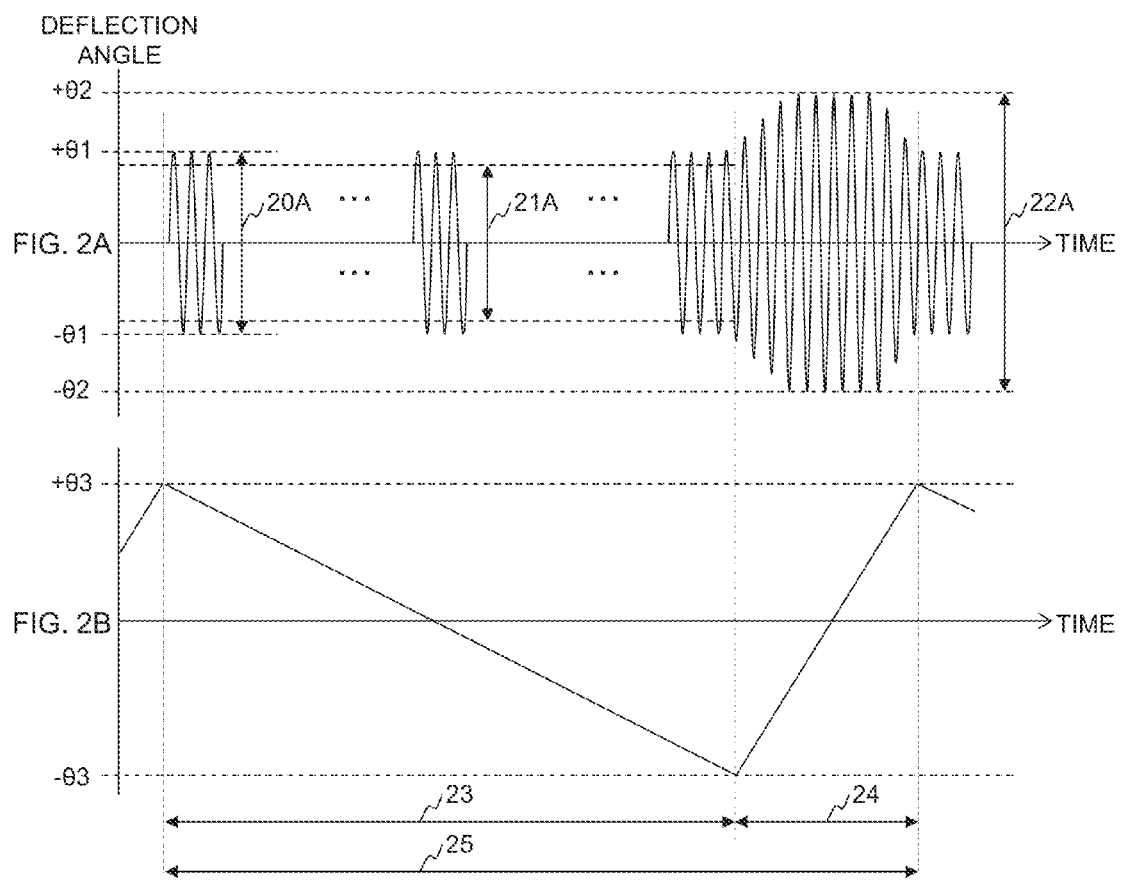
FIGS. 2A and 2B are diagrams for explaining first and second deflection angles according to Example 1.
Figure 3:
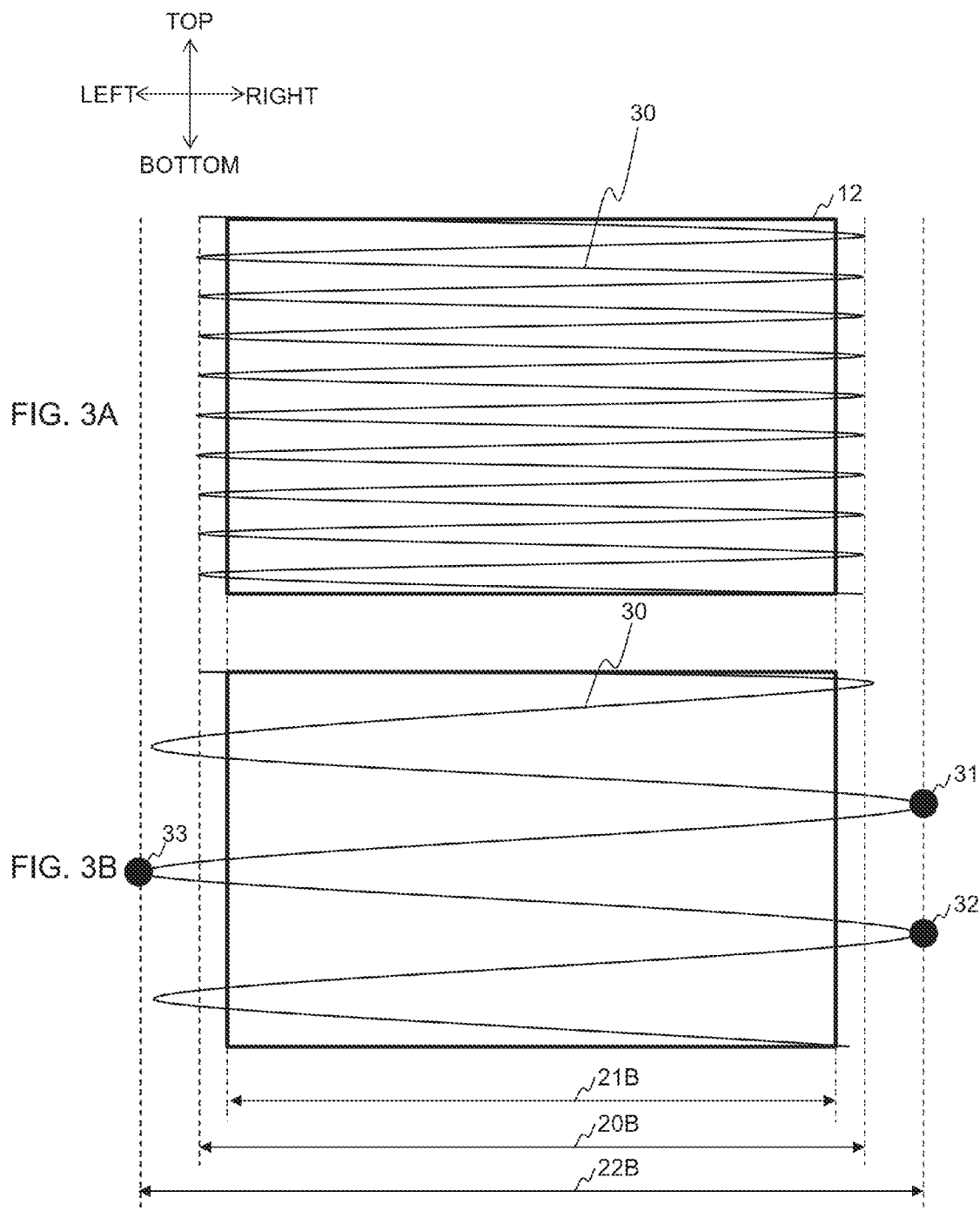
FIGS. 3A and 3B are diagrams showing the operation of a scan mirror and an example of a display image with locations of light emissions for intensity detection, according to Example 1.

Next, a method for easily achieving a blocked light emission for intensity detection with a light blocking object, with a display image kept away from the location of the light emission for intensity detection, without decreasing the brightness of the display image will be described in detail. Specifically, the image processing unit 2 varies the angular range of the first deflection angle (hereinafter, a first amplitude) during a display period, and the first amplitude during a light emission period for intensity detection for the execution of a light emission for intensity detection, thereby keeping the display image away from the location of the light emission for intensity detection. The trajectory of the scan mirror and the positional relationship between a display image and a light emission for intensity detection will be described below with the use of FIGS. 2A and 2B and FIGS. 3A and 3B. FIG. 2A shows a first deflection angle, and FIG. 2B shows a deflection angle (hereinafter, a second deflection angle) in scanning by a second scanning means. In addition, FIGS. 3A and 3B are respectively diagrams showing trajectories 30 of the scan mirror during a vertical display period 23 and a vertical flyback period 24, and an example of the display image 12 with locations (31, 32, 33) of light emissions for intensity detection.

In FIG. 2B, the period during which the second deflection angle varies from $+\theta 3$ to $-\theta 3$ is referred to as the vertical display period 23, whereas the period during which the second deflection angle varies from $-\theta 3$ to $+\theta 3$ is referred to as the vertical flyback period 24. More specifically, the total of these periods corresponds to one frame 25. In addition, the second deflection angle in the case of $+\theta 3$ corresponds to the timing of scanning an upper end of the display image 12 in FIG. 3A, whereas the second deflection angle in the case of $-\theta 3$ corresponds to the timing of scanning a lower end of the display image 12 in FIG. 3A. More specifically, the second scanning means causes the scan mirror to scan the display image from the upper end thereof toward the lower end thereof during the vertical display period 23 (FIG. 3A), and scan the display image from the lower end thereof toward the upper end thereof during the vertical flyback period 24 (FIG. 3B). In addition, the image processing unit 2 drives a laser in accordance with the trajectory of the scan mirror during the horizontal display period in the vertical display period 23, thereby projecting the display image 12. In this regard, the proportion of the vertical display period 23 per frame is increased by increasing the magnitude of the change in second deflection angle per unit time during the flyback period 24. For this reason, the trajectory of a scanning line in FIG. 3B is sparse as compared with the trajectory of a scanning line in FIG. 3A.

Next, the operation of the first deflection angle will be described with the use of FIG. 2A. As shown in FIG. 2A, the operation of the first deflection angle varies between during the vertical display period 23 and the vertical flyback period 24. The image processing unit 2 varies the first deflection angle from $-\theta 1$ to $+\theta 1$ during the vertical display period 23. The scan mirror according to the present example makes sinusoidal resonance motions in the first direction, thus carrying out scanning to locations beyond the left end and right end of the display image 12 (FIG. 3A). This is because, due to the scan speed decreased when the scan mirror turns around in the first direction, the turns are not used for the display image. More specifically, the horizontal projection range 21B from the left end of the display image 12 to the right end thereof, which is obtained from the angular range 21A of the first deflection angle for use in the display image 12, is smaller than the horizontal scan range 20B obtained from the first amplitude 20A during the vertical display period 23.

Next, the first deflection angle and light emission for intensity detection during the vertical flyback period 24 will be described. The image processing unit 2 gradually increases the first amplitude immediately after entering the vertical flyback period 24, and eventually varies the first deflection angle from $-\theta 2$ to $+\theta 2$ (22A). Thereafter, as shown in FIG. 3B, the execution of light emissions for intensity detection in locations further away from the display image 12 than the ends of the horizontal scan range 20B during the vertical display period 23 makes it possible to keep the locations (31, 32, 33) of the light emissions for intensity detection away from the ends of the display image. In this regard, the light emissions for intensity detection are preferably executed at ends of the horizontal scan range 22B obtained from the first amplitude 22A during the vertical flyback period 24. In addition, in order to keep the display image 12 from the locations of the light emissions for intensity detection, it is desirable for the first amplitude 22A during the vertical flyback period 24 to be made at least 2° larger than the first amplitude 20A during the vertical display period 23.

Next, the image processing unit 2 maintains the first amplitude for a predetermined period of time, and then varies the first amplitude to be reduced gradually before entering the vertical display period of the next frame. Then, the image processing unit 2 varies the first deflection angle to fall within the range from −θ1 to +θ1 at the start of the vertical display period of the next frame.

In this regard, other methods for keeping the display image away from the locations of light emissions for intensity detection by the same distance as mentioned above include a case of consistently varying the first deflection angle from −θ2 to +θ2, that is, projecting the display image 12 in the horizontal scan range 22B. However, because of the scanning at a predetermined resonant frequency in the first direction, the proportion of the horizontal projection range 21B to the horizontal scan range 22B is decreased, thereby making the display image 12 relatively dark. In contrast, according to the present example, the scanning in the horizontal scan range 20B during the vertical display period 23 thus makes it possible to increase the proportion of the horizontal projection range 21B, as compared with the case of scanning in the horizontal scan range 22B. As a result, the scanning makes it possible to make the display image 12 relatively bright.

As just described, the present example makes it possible to keep the display image away from the locations of the light emissions for intensity detection without decreasing the brightness of the display image.

Figure 4:
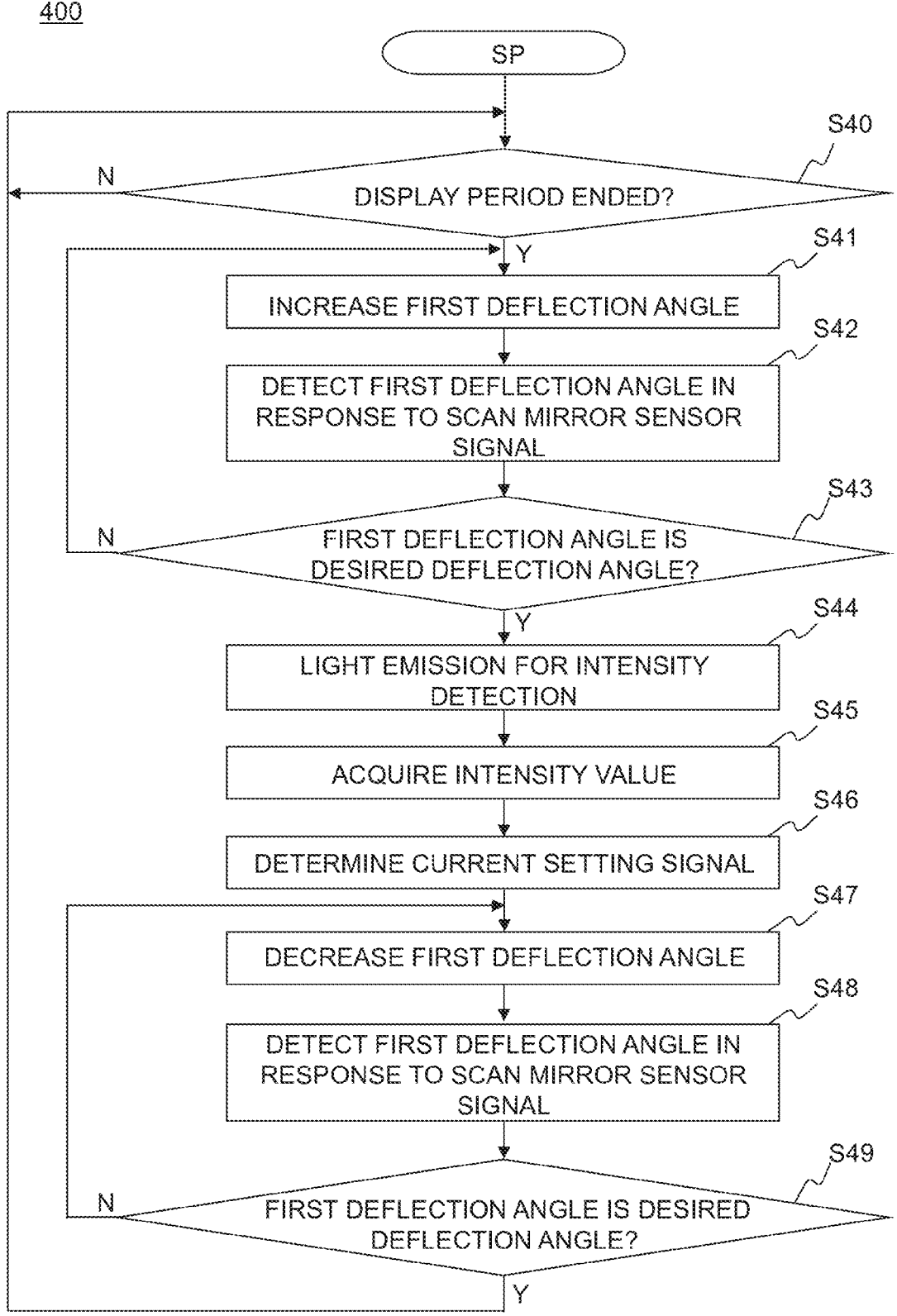
FIG. 4 is a diagram showing a flowchart of light emission processing for intensity detection according to Example 1.

Next, details of the operation will be described with the use of the flowchart in FIG. 4. FIG. 4 is a diagram showing a flowchart of light emission processing for intensity detection, which starts immediately after the power activation of the laser projection display system 1, and the operation is controlled by the image processing unit 2.

In S40, the image processing unit 2 determines whether or not the period in question is a flyback period. If the period in question is not any flyback period, the operation is on standby until entering a flyback period, or if the period in question is determined to be a flyback period, the operation moves on to S41. In S41, an amplitude control signal is delivered to the MEMS driver 8 so as to increase the first amplitude. In S42, the first deflection angle is detected by receiving a scan mirror sensor signal from the scan mirror 7. In S43, the values of the desired first deflection angle ±θ2 for the MEMS scan mirror 7, which are received from the CPU 11, are compared with the value of the first deflection angle acquired in S42, and if the current amplitude is less than the desired first amplitude 22A, the operation is returned to S41 to repeat S41 to S43. When the current amplitude meets the desired first amplitude 22A in S43, the operation moves on to S44 to execute a light emission for intensity detection once or more than once. In this regard, the light emission for intensity detection is executed at ends of the horizontal scan range 22B as shown in FIG. 3B. In S45, the intensity value of the respective light emissions for intensity detection, executed in S44, are acquired via the optical sensor 10 and the amplifier 9, and in S46, current setting signals set for the laser driver 4 are determined in accordance with the intensity values acquired in S45.

In S47, the amplitude control signal is delivered to the MEMS driver 8 so as to reduce the first amplitude. In S48, the first deflection angle is detected by receiving a scan mirror sensor signal from the scan mirror 7. In S49, the values of the desired first deflection angle ±θ1 for the MEMS scan mirror 7, which are received from the CPU 11, are compared with the value of the first deflection angle acquired in S48, and if the current amplitude is greater than the desired first amplitude 20A, the operation is returned to S47 to repeat S47 to S49. When the current amplitude meets the desired first amplitude 20A in S49, the operation is returned S40 for standby until the flyback period of the next frame.

According to Example 1 as mentioned above, the image processing unit 2 varies the first amplitude during the display period and the first amplitude during the light emission period for intensity detection, thereby making it possible to keep the display image away from the locations of light emissions for intensity detection. Thus, a laser projection display system can be provided which can easily achieve a blocked light emission for intensity detection with a light blocking object, with a display image kept away from the location of a light emission for intensity detection, without decreasing the brightness of the display image.

It is to be noted that while an example of the projection-type projector for displaying images has been cited as a laser projection display system in the foregoing description, the invention is not limited thereto, but it is also possible to apply the invention to in-car headlights and the like that use laser light sources. Also in the case of the headlights, blocked light emissions for intensity detection with a light blocking object can be easily achieved by keeping the laser projection ranges away from the locations of the light emissions for intensity detection.

Example 2

An example of detecting the first deflection angle in response to the reception of a scan mirror sensor signal in the light emission processing for intensity detection has been described in Example 1. In contrast, a laser projection display system according to Example 2 has an optical sensor for light emitting location detection on an optical path after scanning with laser light through a scan mirror, and this optical sensor for light emitting location detection is used to specify the location of a light emission for intensity detection. More specifically, providing the optical sensor for light emitting location detection in a region to be shielded makes it possible to block a light emission for intensity detection in a reliable manner. In addition, with the addition of light emission processing for location detection, the feedback control makes it possible to associate, with a high degree of accuracy, a scan mirror sensor signal with a first deflection angle.

An embodiment according to Example 2 will be described below with the use of FIGS. 5 and 6. Hereinafter, elements that have the same configurations and functions as those in Example 1 will be denoted by the same symbols, and detailed descriptions of the elements will be left out.

Figure 5:
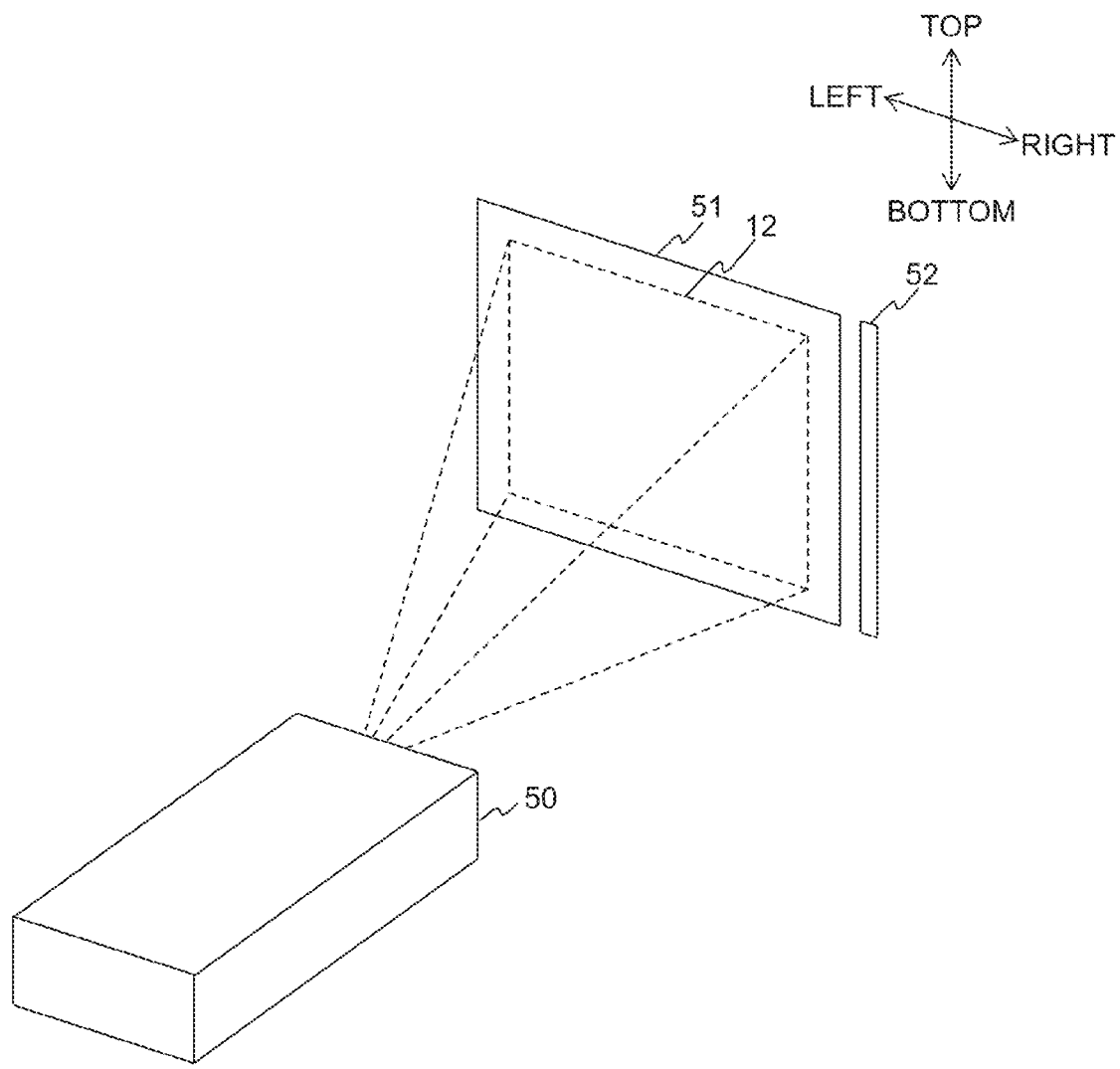
FIG. 5 is a perspective view of a laser projection display system according to Example 2 and a peripheral system therefor.
Figure 6:
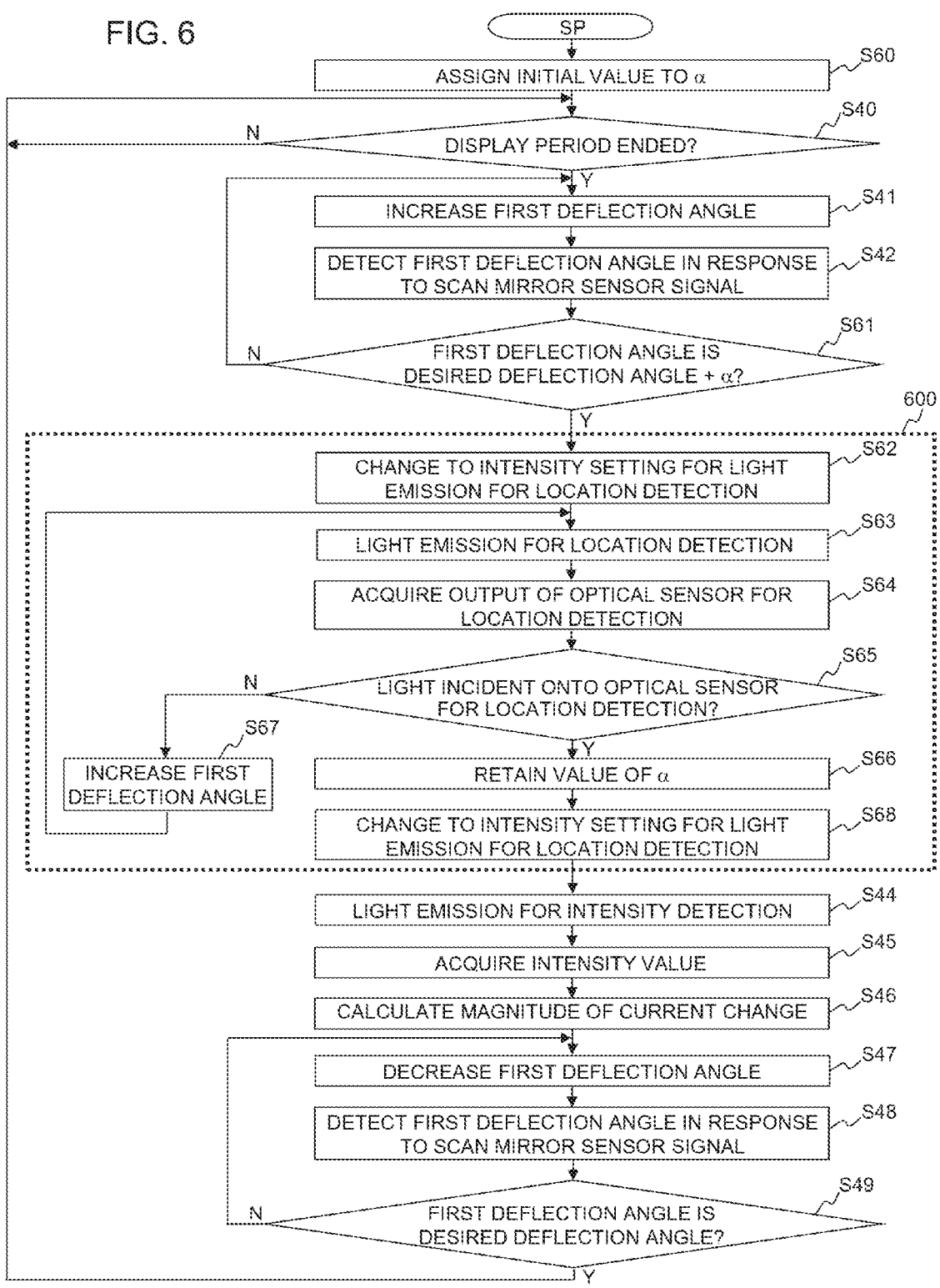
FIG. 6 is a diagram showing a flowchart of light emission processing for intensity detection according to Example 2.

FIG. 5 is a perspective view including a laser projection display system 50, a screen 51, a display image 12, and an optical sensor 52 for light emitting location detection. In this regard, the laser projection display system 50 differs from the laser projection display system 1 according to Example 1, in that the laser projection display system 50 has a receiving unit, not shown, for an image processing unit 2 to receive the output from the optical sensor 52 for light emitting location detection. In this regard, the optical sensor 52 for light emitting location detection may have either optical sensors arranged linearly as shown in FIG. 5, or optical sensors arranged in an array form. In addition, the optical sensor 52 for light emitting location detection is disposed only on one side with respect to the display image 12 in FIG. 5, but the invention is not limited thereto, and of course, may be disposed on both sides with respect to the display image 12.

Incorporating the optical sensor 52 for light emitting location detection into a mechanical unit for holding the screen 51 will provide the optical sensor 52 for light emitting location detection in a region to be shielded, thereby making it possible to block light emissions for intensity detection in a reliable manner. As another example, the optical sensor 52 for light emitting location detection may be provided at alight emitting window of the laser projection display system 50 or inside the system, thereby blocking light emissions for intensity detection. More specifically, any configuration may be adopted, as long as the configuration has the optical sensor for light emitting location detection on the optical path after scanning with laser light through the scan mirror.

Next, light emission processing for intensity detection according to Example 2 will be described with the use of the flowchart in FIG. 6. FIG. 6 is an example of the flowchart of the light emission processing for intensity detection in FIG. 4 with added operation of light emission processing 600 for location detection with the use of the optical sensor 52 for light emitting location detection, and the operation is controlled by the image processing unit 2.

The present flowchart is started immediately after the power activation of the laser projection display system 50. First, an initial value is assigned to $\alpha$ in S60. In this regard, $\alpha$ refers to a correction value for correcting a targeted deflection angle, which is obtained by the light emission processing 600 for location detection as will be described later. In addition, the initial value is a value of $\alpha$ in the previous activation, which is retained in a storage area, not shown, and applied, or $\alpha=0$ for initialization.

In S61, the values of additions of desired first deflection angles $\pm\theta2$ and $\alpha$ for a MEMS scan mirror 7, which are received from a CPU 11, are compared with the value of the first deflection angle acquired in S42, and if the current deflection angle is less than the desired first deflection angle $\pm\theta2+\alpha$, the operation is returned to S41 to repeat S41 to S61. When the current amplitude meets the desired first deflection angle $\pm\theta2+\alpha$ in S61, the operation moves on to the light emission processing 600 for location detection. In S62, current setting signals are delivered to a laser driver 4 so as to achieve sufficiently low light intensity with respect to the display image 12. In this regard, the light intensity of the light emission for location detection is desirably 1/100 or less of the maximum light intensity of the display image 12. This desired light intensity makes it possible to reduce the risk of visual recognition by users, even when a light emission for location detection, which is executed during a vertical flyback period 24, has a spatial overlap with the display image 12.

Next, in S63, the light emission for location detection is executed, and in S64, the output value of the optical sensor 52 for light emitting location detection is acquired. In S65, whether or not light is incident onto the optical sensor 52 for light emitting location detection, that is, whether or not the output value can be acquired in S64 is determined. In this regard, the light emission for location detection in S63 is desirably a light emission on a continuing basis within a continuous first deflection angle range from first deflection angles $\pm\theta1$ during a vertical display period 23 to the first deflection angles $\pm\theta2+\alpha$ during the vertical flyback period 24. This light emission makes it possible to determine that the value of the first deflection angle $\pm\theta2+\alpha$ used for the determination in S61 is an insufficient deflection angle, when the light emission for location detection fails to make light incident onto the optical sensor 52 for light emitting location detection in S65. In this case, in S67, an amplitude control signal is deliver to a MEMS driver 8 so as to increase the first amplitude, and the operation is returned to S63. If light is made incident onto the optical sensor 52 for light emitting location detection in S65, the operation moves on to S66 to retain the value of $\alpha$. In this regard, $\alpha$ refers to a correction value for correcting a targeted deflection angle, which is thus calculated by detecting the first deflection angle in response to a scan mirror sensor signal, and obtaining a difference from the desired first deflection angle $\pm\theta2$ for the MEMS scan mirror 7 in S66. In S68, current setting signals are delivered to the laser driver 4 so as to achieve light intensity for a light emission for intensity detection.

As just described, with the addition of the light emission processing 600 for location detection, the feedback control makes it possible to associate, with a high degree of accuracy, a scan mirror sensor signal with a first deflection angle.

It is to be noted that the light emission processing 600 for light emitting location detection is executed during the flyback period for each frame in the example mentioned above, but the invention is not limited thereto, and may be executed per frame or only when the display image 12 is bright. In such a case, a feedback effect equivalent to that in the example mentioned above is achieved with $\alpha$ retained in a storage area, not shown.

In addition, an example of using a scan mirror sensor signal has been described in the example mentioned above, but the invention is not limited thereto, and the light emission processing 600 for location detection may be directly associated with an amplitude control signal delivered to the MEMS driver 8, without using any scan mirror sensor signal. Specifically, the retention of an amplitude control signal value in the case of light incidence onto the optical sensor 52 for location detection makes it possible to specify the location of a light emission for intensity detection.

According to Example 2 as mentioned above, with the use of the optical sensor for location detection, the image processing unit 2 varies the first amplitude during the display period and the first amplitude during the light emission period for intensity detection, thereby making it possible to keep the display image away from the locations of light emissions for intensity detection. Thus, a laser projection display system can be provided which can easily achieve a blocked light emission for intensity detection with a light blocking object, with a display image kept away from the location of a light emission for intensity detection, without decreasing the brightness of the display image.

Example 3

An example in which the MEMS scan mirror 7 makes sinusoidal resonance motions in the horizontal direction as the first direction in response to sinusoidal driving signals from the MEMS driver 8 and makes unidirectional uniform motions in the vertical direction as the second direction in response to sawtooth wave driving signals therefrom has been described in Example 1. In contrast, a MEMS scan mirror in a laser projection display system according to Example 3 makes sinusoidal resonance motions in the horizontal direction as the first direction in response to sinusoidal driving signals from a MEMS driver, and also makes sinusoidal resonance motions in the vertical direction as the second direction in response to sinusoidal driving signals that are different from those in the horizontal direction, from the MEMS driver.

More specifically, although details will be described later, the scam mirror according to the present example also makes sinusoidal resonance motions in the vertical direction as the second direction, thus carrying out scanning to locations beyond the upper end and lower end of a display image 12. This is because, due to the scan speed decreased when the scan mirror turns around in the second direction, the turns are not used for the display image. In addition, near the upper end and lower end of the display image, the scan speed of the scan mirror is decreased as compared with in the central part of the screen, and the upper and lower ends thus become relatively bright as compared with the central part of the screen, in the case of projection with certain light intensity from a laser light source.

Therefore, according to the present example, in accordance with the deflection angle in scanning by the second scanning means, the proportion of a display period during which image signals are displayed in one period for the first scanning means is varied, and the first amplitude is varied. Thus, the adoption of the period other than the display period in one period for the first scanning means, as a light emission period for intensity detection to detect laser light intensity, makes it possible to keep the display image 12 away from locations of light emissions for intensity detection. In addition, the adoption also makes it possible to make the luminance near the upper end and lower end of the screen closer to the luminance in the central part of the screen. Hereinafter, elements that have the same configurations and functions as those in Example 1 will be denoted by the same symbols, and detailed descriptions of the elements will be left out.

Figure 7:
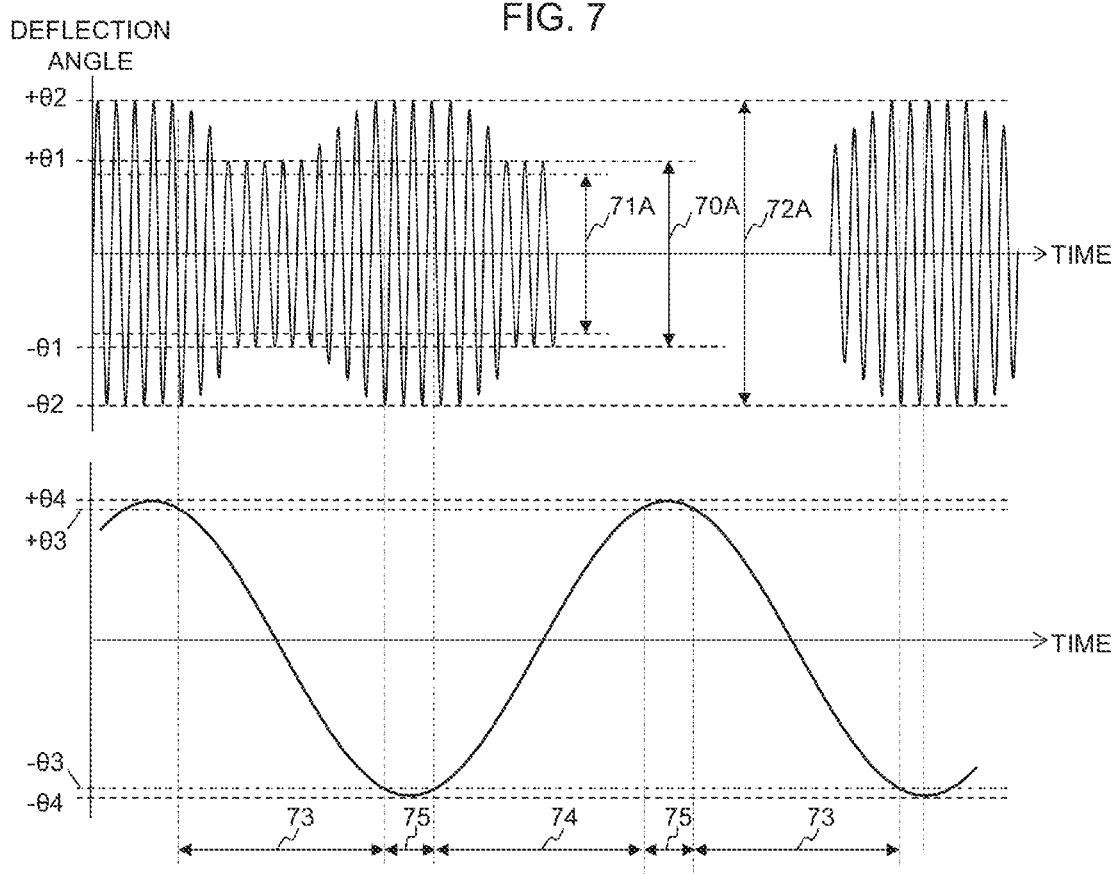
FIG. 7 is a diagram for explaining first and second deflection angles according to Example 3.

The trajectory of a scan mirror according to Example 3 and the positional relationship between a display image and a light emission for intensity detection will be described with the use of FIGS. 7 and 8. FIG. 7A shows a first deflection angle, and FIG. 7B shows a second deflection angle. In addition, FIGS. 8A and 8B are respectively diagrams showing trajectories 80 of the scan mirror during a first vertical display period 73 and a second vertical display period 74, and an example of the display image 12 with locations (81, 82, 83) of light emissions for intensity detection.

In FIG. 7B, the period during which the second deflection angle varies from +θ3 to −θ3 is referred to as the first vertical display period 73, whereas the period during which the second deflection angle varies from −θ3 to +θ3 is referred to as the second vertical display period 74. In this regard, the scan mirror also makes sinusoidal resonance motions in the vertical direction as the second direction, thus carrying out scanning to locations +θ4 and −θ4 beyond the upper end and lower end of the display image 12. This is because, due to the scan speed decreased when the scan mirror turns around in the second direction, the turns are not used for the display image. In this regard, the period with the second deflection angle from −θ3 through −θ4 back to −θ3, or the period from +θ3 through +θ4 back to +θ3 is referred to as a vertical flyback period 75.

Figure 8:
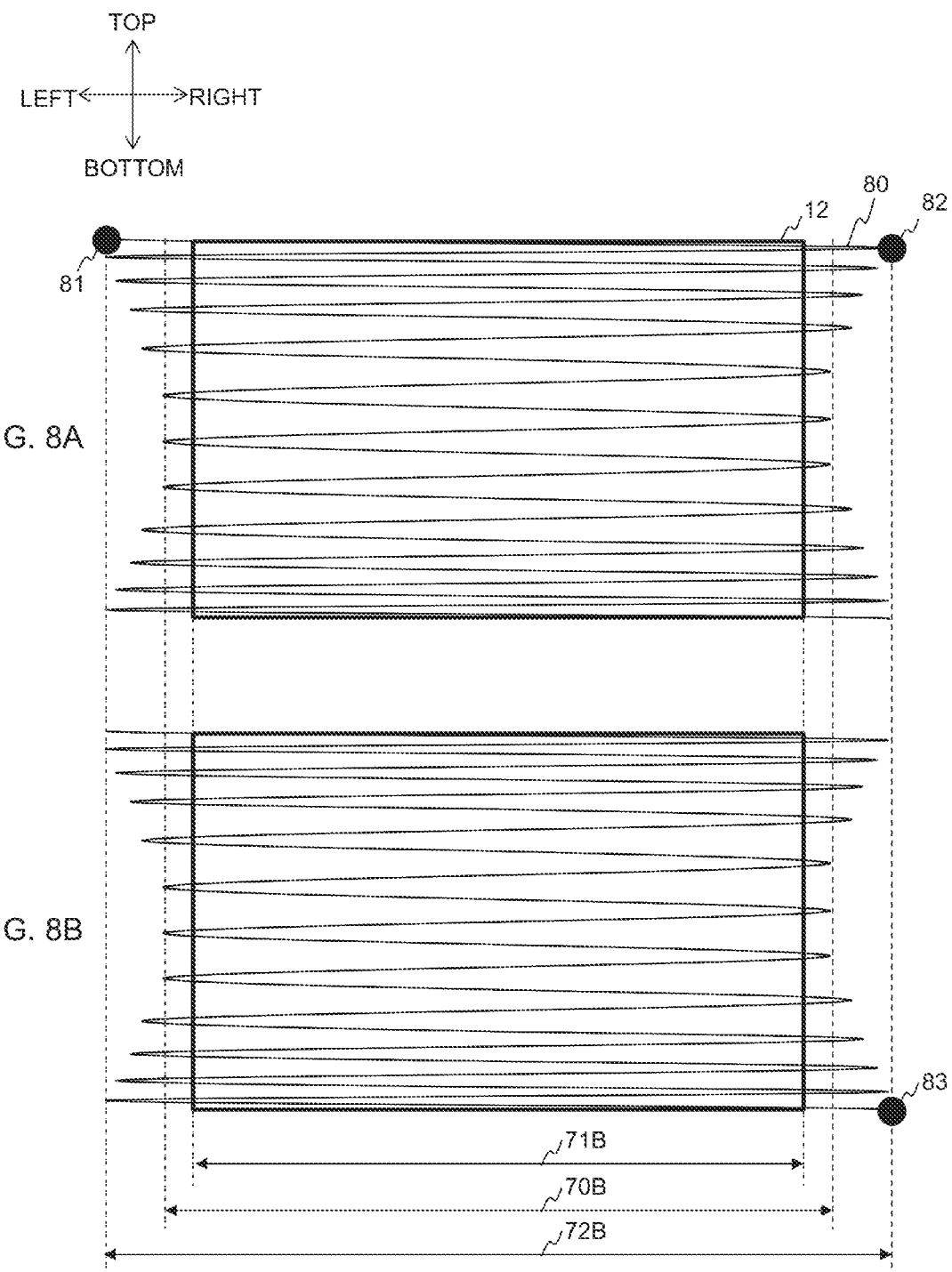
FIGS. 8A and 8B are diagrams showing the operation of a scan mirror and an example of a display image with locations of light emissions for intensity detection, according to Example 3.
Figure 9:
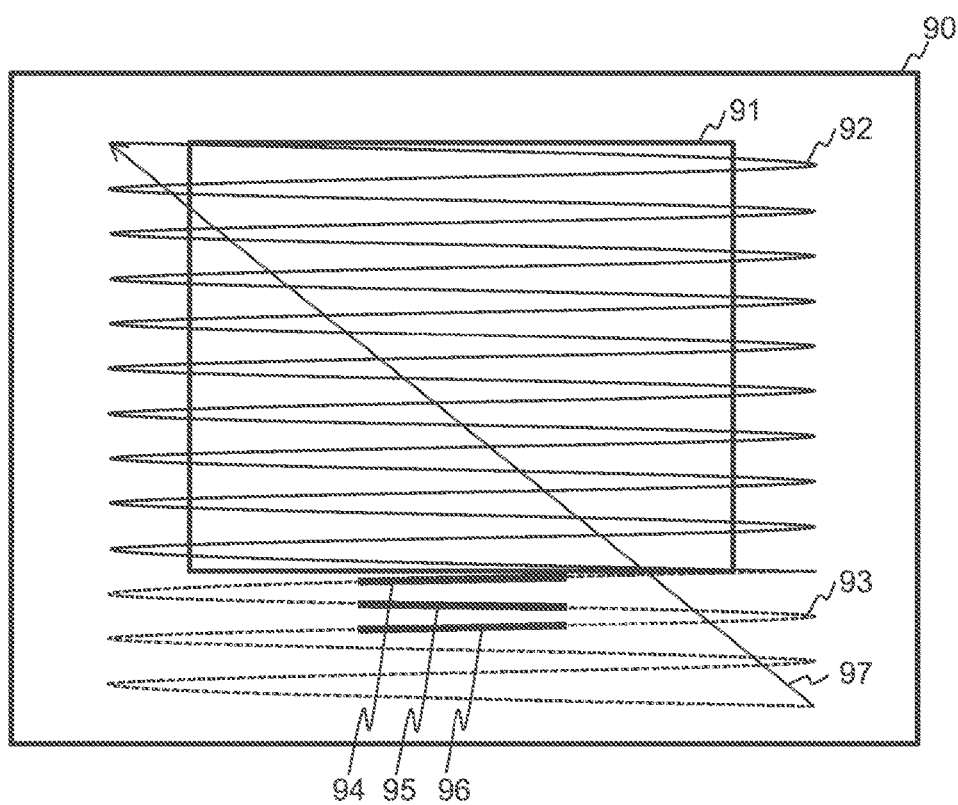
FIG. 9 is a diagram for explaining a conventional example.

In addition, the second deflection angle in the case of +θ3 corresponds to the timing of scanning the upper end of the display image 12 in FIG. 8, whereas the second deflection angle in the case of −θ3 corresponds to the timing of scanning the lower end of the display image 12 in FIG. 8. More specifically, the second scanning means causes the scan mirror to scan the display image from the upper end thereof toward the lower end thereof during the first vertical display period 73 (FIG. 8A), and scan the display image from the lower end thereof toward the upper end thereof during the second vertical display period 74 (FIG. 8B).

Next, the operation of the first deflection angle will be described with the use of FIG. 7A. As shown in FIG. 7A, the operation of the first deflection angle is varied in accordance with the second deflection angle. The image processing unit 2 varies the first deflection angle from −θ1 to +θ1 when the second deflection angle reaches nearly 0 (in the case of scanning a substantially central part of the screen in the vertical direction). The scan mirror according to the present example makes sinusoidal resonance motions in the first direction, thus carrying out scanning to locations beyond the left end and right end of the display image 12 (FIG. 8). This is because, due to the scan speed decreased when the scan mirror turns around in the first direction, the turns are not used for the display image. More specifically, the horizontal projection range 71B from the left end of the display image 12 to the right end thereof, which is obtained from the angular range 71A of the first deflection angle for use in the substantially central part of the screen in the vertical direction in the display image 12, is smaller than the horizontal scan range 70B obtained from a first amplitude 70A during the first vertical display period 73 and the second vertical display period 74. Next, the first deflection angle and light emission for intensity detection will be described in the case of the second deflection angle near +θ3 or −θ3, that is, in the case of the second scanning means in scanning near the upper end or lower end of the display image. The image processing unit 2 gradually increases the first amplitude as the absolute value of the second deflection angle increases from when the second deflection angle reaches nearly 0 (in the case of scanning a substantially central part of the screen in the vertical direction), and eventually varies the first deflection angle from −θ2 to +θ2 (72A). Thereafter, as shown in FIG. 8, the execution of light emissions for intensity detection in locations further away from the display image 12 than the ends of the horizontal scan range 70B in the case of scanning the substantially central part of the screen in the vertical direction makes it possible to keep the locations (81, 82, 83) of the light emissions for intensity detection away from the ends of the display image. In this regard, the light emissions for intensity detection are preferably executed at ends of the horizontal scan range 72B obtained from the first amplitude 72A.

Thereafter, the image processing unit 2 maintains the first amplitude for a predetermined period of time, then gradually decreases the first amplitude as the absolute value of the second deflection angle decreases, and finally varies the first deflection angle from −θ1 to +θ1 when the second deflection angle reaches nearly 0.

In this regard, the image processing unit 2 varies the first amplitude in accordance with the second deflection angle as mentioned above, and at the same time, varies the proportion of the display period during which image signals are displayed in one period for the first scanning means. More specifically, at any first amplitude, the laser is driven such that the horizontal projection range 71B from the left end of the display image 12 to the right end thereof is always fixed. Because of scanning in the first direction at a predetermined resonant frequency, the proportion of the horizontal projection range 71B to the horizontal scan range 72B is decreased with respect to the proportion of the horizontal projection range 71B to the horizontal scan range 70B, thereby resulting in a decrease in luminance. However, this decrease in luminance can be cancelled by the increase in luminance of the luminance increased near the upper end and lower end of the screen as compared with the central part of the screen, due to the sinusoidal resonance motions in the second direction.

According to Example 3 as mentioned above, the image processing unit 2 varies, in accordance with the deflection angle in scanning by the second scanning means, the proportion of the display period during which image signals are displayed in one period for the first scanning means, and varies the first amplitude, thereby making it possible to keep the display image away from the locations of light emissions for intensity detection. Thus, a laser projection display system can be provided which can easily achieve a blocked light emission for intensity detection with a light blocking object, with a display image kept away from the location of a light emission for intensity detection, while the luminance near the upper end and lower end of a screen is brought close to the luminance in the central part of the screen.

What is claimed is:

1. A laser projection display system configured to execute, by swinging a scan mirror, scanning with laser light of multiple colors in accordance with image signals, thereby displaying an image in accordance with the image signals, the laser projection display system comprising:
    a timing adjustment unit configured to divide temporally a display period during which the image signals are displayed and a light emission period for intensity detection to detect intensity of the laser light;
    a laser light source configured to generate the laser light of the multiple colors;
    a laser light source driving unit configured to drive the laser light source in synchronization with a signal from the timing adjustment unit; and
    a scan mirror driving unit comprising: first scanning means configured to execute scanning in a first direction in response to synchronization signals according to the image signals, with laser light generated by the laser light source through the scan mirror; and second scanning means configured to execute scanning in a second direction substantially perpendicular to the first direction at a lower speed than the first scanning means,
    wherein the scan mirror driving unit increases an angular range of a deflection angle in scanning by the first scanning means during the light emission period more than an angular range of a deflection angle during the display period.

2. The laser projection display system according to claim 1, wherein a scanning direction for a projection display image by the second scanning means is different between the display period and the light emission period.

3. The laser projection display system according to claim 1, wherein the light emission period is a vertical flyback period for the image signals.

4. The laser projection display system according to claim 1, wherein the angular range of the deflection angle in scanning by the first scanning means during the light emission period is at least 2° larger than the angular range of the deflection angle during the display period.

5. The laser projection display system according to claim 1, comprising an optical sensor for light emitting location detection on an optical path after scanning with the laser light through the scan mirror,
    wherein a location of the light emission for intensity detection is specified by sensing an output of the optical sensor for light emitting location detection.

6. The laser projection display system according to claim 5, wherein the laser light source is driven at a second luminance that is different from a first luminance that is a luminance of a currently displayed display image during the light emission period, and the location of the light emission for intensity detection is specified by sensing the output of the optical sensor for light emitting location detection.

7. The laser projection display system according to claim 6, wherein the second luminance is equal to or less than $\frac{1}{100}$th of the first luminance.

8. A laser projection display system configured to execute, by swinging a scan mirror, scanning with laser light of multiple colors in accordance with image signals, thereby displaying an image in accordance with the image signals, the laser projection display system comprising:
    a laser light source configured to generate the laser light of the multiple colors;
    a laser light source driving unit configured to drive the laser light source;
    a scan mirror driving unit comprising: first scanning means configured to execute scanning in a first direction in response to synchronization signals according to the image signals, with laser light generated by the laser light source through the scan mirror; and second scanning means configured to execute scanning in a second direction substantially perpendicular to the first direction at a lower speed than the first scanning means; and
    a timing adjustment unit configured to vary proportions of a display period, during which the image signals are displayed in one period for the first scanning means, and of a light emission period for intensity detection to detect intensity of the laser light, in accordance with a deflection angle in scanning by the second scanning means,
    wherein the scan mirror driving unit varies an angular range of a deflection angle in scanning by the first scanning means in accordance with the proportion of the display period in one period for the first scanning means.

9. The laser projection display system according to claim 8, wherein a scanning direction for a projection display image by the second scanning means is different between the display period and the light emission period.

10. The laser projection display system according to claim 8, wherein the light emission period is a vertical flyback period for the image signals.

11. The laser projection display system according to claim 8, wherein the angular range of the deflection angle in scanning by the first scanning means during the light emission period is at least 2° larger than the angular range of the deflection angle during the display period.

12. The laser projection display system according to claim 8, comprising an optical sensor for light emitting location detection on an optical path after scanning with the laser light through the scan mirror,
    wherein a location of the light emission for intensity detection is specified by sensing an output of the optical sensor for light emitting location detection.

13. The laser projection display system according to claim 12, wherein the laser light source is driven at a second luminance that is different from a first luminance that is a luminance of a currently displayed display image during the light emission period, and the location of the light emission for intensity detection is specified by sensing the output of the optical sensor for light emitting location detection.

14. The laser projection display system according to claim 13, wherein the second luminance is equal to or less than $\frac{1}{100}$th of the first luminance.

* * * * *